United States Patent
Medalion et al.

(10) Patent No.: US 11,228,610 B2
(45) Date of Patent: Jan. 18, 2022

(54) SYSTEM AND METHOD FOR CLASSIFYING CYBER SECURITY THREATS USING NATURAL LANGUAGE PROCESSING

(71) Applicant: Cybereason Inc., Boston, MA (US)

(72) Inventors: Shlomi Medalion, Lod (IL); Rami Cohen, Haifa (IL); Ron Katz, Mazkeret-Batya (IL); Idan Bellayev, Tel-Aviv (IL); Avi Chesla, Brookline, MA (US)

(73) Assignee: Cybereason Inc., Boston, MA (US)

( * ) Notice: Subject to any disclaimer, the term of this patent is extended or adjusted under 35 U.S.C. 154(b) by 620 days.

(21) Appl. No.: 16/103,485

(22) Filed: Aug. 14, 2018

(65) Prior Publication Data
US 2020/0162496 A1 May 21, 2020

Related U.S. Application Data

(63) Continuation-in-part of application No. 15/182,827, filed on Jun. 15, 2016, now Pat. No. 10,122,762.

(60) Provisional application No. 62/546,831, filed on Aug. 17, 2017.

(51) Int. Cl.
*H04L 29/06* (2006.01)
*G06F 40/295* (2020.01)

(52) U.S. Cl.
CPC ........ *H04L 63/1433* (2013.01); *G06F 40/295* (2020.01); *H04L 63/1416* (2013.01)

(58) Field of Classification Search
CPC ... G06F 40/295; G06F 40/30; H04L 63/1416; H04L 63/1433
See application file for complete search history.

(56) References Cited

U.S. PATENT DOCUMENTS

| | | |
|---|---|---|
| 7,933,989 B1 | 4/2011 | Barker et al. |
| 8,150,783 B2 | 4/2012 | Gonsalves et al. |
| 8,572,750 B2 | 10/2013 | Patel et al. |
| 8,800,045 B2 | 8/2014 | Curtis et al. |
| 9,680,846 B2 | 6/2017 | Haugsnes |
| 9,747,446 B1* | 8/2017 | Pidathala ............... G06F 21/56 |
| 2003/0217033 A1 | 11/2003 | Sandler et al. |
| 2004/0114519 A1 | 6/2004 | MacIsaac |
| 2004/0143756 A1 | 7/2004 | Munson et al. |

(Continued)

OTHER PUBLICATIONS

Yang, et al., "Optimized Very Fast Decision Tree With Balanced Classification Accuracy and Compact Tree Size," The 3rd International Conference on Data Mining and Intelligent Information Technology Applications, Macao, pp. 57-64, IEEE 2011, 2011.

(Continued)

*Primary Examiner* — Theodore C Parsons
(74) *Attorney, Agent, or Firm* — DLA Piper LLP (US)

(57) ABSTRACT

A method and system for classification of cyber-threats is provided. The method includes receiving a request for classifying a cyber-threat detected by a cyber-security system, wherein the request includes initial information about the detected cyber-threat; enriching the initial information about the detected cyber-threat to provide textual information about at least one perceived threat related to the detected cyber-threat; and classifying each of the at least one perceived threat into a security service, wherein the classification is performed based on the respective textual information.

15 Claims, 6 Drawing Sheets

(56) References Cited

U.S. PATENT DOCUMENTS

| | | |
|---|---|---|
| 2005/0049990 A1 | 3/2005 | Milenova et al. |
| 2012/0096549 A1 | 4/2012 | Amini et al. |
| 2012/0263376 A1 | 10/2012 | Wang et al. |
| 2012/0304007 A1 | 11/2012 | Hanks et al. |
| 2013/0097706 A1* | 4/2013 | Titonis ............... G06F 21/566 726/24 |
| 2013/0198840 A1 | 8/2013 | Drissi et al. |
| 2013/0276122 A1 | 10/2013 | Sowder |
| 2014/0208426 A1* | 7/2014 | Natarajan .......... H04L 63/1408 726/23 |
| 2014/0215618 A1 | 7/2014 | Amit |
| 2014/0280166 A1 | 9/2014 | Bryars et al. |
| 2014/0283026 A1 | 9/2014 | Amit et al. |
| 2014/0283050 A1 | 9/2014 | Amit |
| 2014/0337974 A1 | 11/2014 | Joshi et al. |
| 2016/0212166 A1 | 7/2016 | Henry et al. |
| 2016/0212167 A1 | 7/2016 | Dotan et al. |
| 2016/0335435 A1* | 11/2016 | Schmidtler ............ G06N 20/00 |
| 2017/0018075 A1 | 1/2017 | Middlebrooks et al. |
| 2017/0091673 A1 | 3/2017 | Gupta et al. |
| 2017/0116544 A1 | 4/2017 | Johnson et al. |
| 2018/0027006 A1 | 1/2018 | Zimmermann et al. |

OTHER PUBLICATIONS

The International Search Report and the Written Opinion of the International Searching Authority for PCT/US2015/039664, ISA/RU, Moscow, Russia, dated Oct. 15, 2015.

The International Search Report and The Written Opinion of the International Searching Authority for PCT/US2015/060109, ISA/RU, Moscow, Russia, dated Mar. 10, 2016.

* cited by examiner

SYSTEM AND METHOD FOR CLASSIFYING CYBER SECURITY THREATS USING NATURAL LANGUAGE PROCESSING

CROSS-REFERENCE TO RELATED APPLICATIONS

This application claims the benefit of U.S. Provisional Application No. 62/546,831 filed on Aug. 17, 2017. This application is also a continuation-in-part (CIP) of U.S. patent application Ser. No. 15/182,827, filed on Jun. 15, 2016, now allowed. All of the applications referenced above are hereby incorporated by reference.

TECHNICAL FIELD

The present disclosure relates generally to cyber security systems, and more particularly to real time classification of cyber security threats.

BACKGROUND

The Internet provides access to various pieces of information, applications, services, and vehicles for publishing information. Today, the Internet has significantly changed the way we access and use information and services (e.g., banking, e-commerce, e-trading, and the like). In order to access such services, users often share personal information with service providers. Similarly, confidential information of companies is stored on systems that are connected to the Internet.

Recently, the frequency and complexity level of cyber-attacks has increased with respect to attacks performed against all organizations including, but not limited to, cloud providers, enterprises, organizations, and network carriers. Some complex cyber-attacks, known as advanced persistent attack campaigns, utilize different types of attack techniques and target network, application, and end-point resources in order to achieve the attack's goals, thereby compromising the entire security framework of the network. The intention of an advanced persistent attack campaign is usually to steal data rather than to cause direct damage to the network or organization. These attacks typically target organizations in sectors with high-value information such as the national defense, manufacturing, retail, and financial industries.

To secure their systems, infrastructure, and services, enterprises utilize many different security products provided by different vendors. Typically, such products are utilized to detect and/or mitigate different vulnerabilities or threats. As an example, an enterprise network can implement one security product for an intrusion detection system (IDS) and another product for detecting malware download. Particularly, a typical enterprise network will be protected by firewalls, anti-virus software, malware detection software, authentication and authorization systems, intrusion detection, anti-phishing systems, network and end point behavior analysis, data leak prevention systems, web application firewalls (WAFs), and so on.

The security products are typically deployed in different segments of the enterprise network, e.g., at different servers, end-points (client computers), at networks, and so on. Further, different products, provided by different vendors, for protecting against the same type of threat can be typically utilized in combination to enhance the security. For example, IDS software provided by both Cisco® and McAfee® can be installed to protect end-points and servers in the enterprise network.

Cyber security threat detection services, such as anti-malware, anti-virus, intrusion detection systems, and security reputation and security intelligence services, are an essential part of maintaining adequate security and technical integrity against malicious attack campaigns.

Known techniques of threat detection include analysis in which some human input is required to categorize possible malicious activities into various threat groups. The possible malicious activities are typically reported in a log format that includes various threat identifiers, such as names, brief descriptions of the attack, unique numerical values, or hash values, of the possibly malicious file, links to threat intelligence reports and behavioral report, etc. The categorization of possible malicious activities into various threat groups can assist in identifying negative impacts in order to analyze the context of the overall attack campaign.

Proper analysis may include searching for additional information, not included in the attack logs, regarding a detected threat. Such information may include gathering known threat intelligence feeds, textual description inside security research reports, and other human written threat intelligence information that may provide an indication regarding the intentions of the attackers. The analysis is performed by security experts or researches (human analysis). As such, the time required for threat analysis can typically range from a few minutes to a number of hours or even days per threat indication, even if performed by a well-trained security expert. Therefore, the ability of an attacked entity to react and mitigate a potential attack in real time or near real-time is greatly reduced. In addition, in order to shorten the analysis process, often only a small fraction of the available information is gathered, compared, and processed, which can reduce the overall coverage and accuracy of the analysis.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some disclosed embodiments include a method for classification of cyber-threats. The method includes receiving a request for classifying a cyber-threat detected by a cyber-security system, wherein the request includes initial information about the detected cyber-threat; enriching the initial information about the detected cyber-threat to provide textual information about at least one perceived threat related to the detected cyber-threat; and classifying each of the at least one perceived threat into a security service, wherein the classification is performed based on the respective textual information.

Some disclosed embodiments include a cyber-security system for classifying security rules of a plurality of different security products into a security decision engine in a service, comprising: a processing circuitry; a memory connected to the processing circuitry, wherein the memory contains instructions that, when executed by the processing circuitry, configure the cyber-security system to: receive a request for classifying a cyber-threat detected by a cyber-security system, wherein the request includes initial information about the detected cyber-threat; enrich the initial information about the detected cyber-threat to provide textual information about at least one perceived threat related to the detected cyber-threat; and classify each of the at least one perceived threat into a security service, wherein the classification is performed based on the respective textual information.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
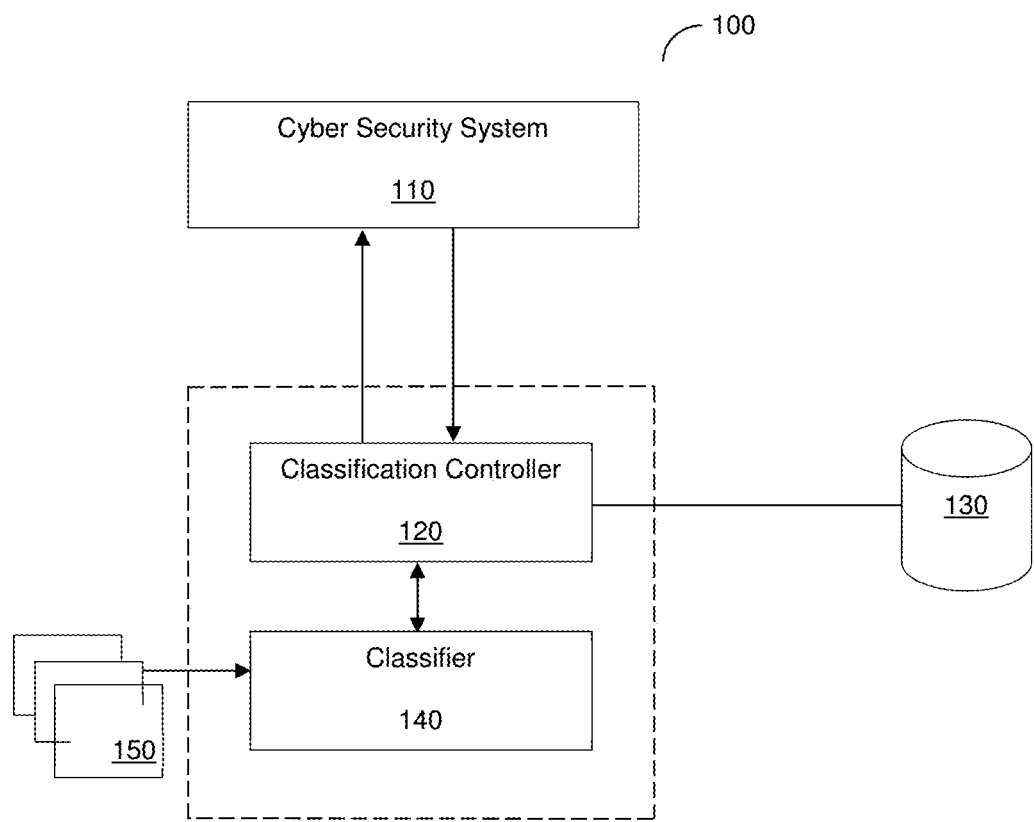
FIG. 1 is a diagram utilized to describe the various embodiments for cyber-threat classification.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments include a method and system for performing a machine-based cyber-threat classification that analyzes a cyber-threat in order to assist in deciphering the intention behind a cyber-attack event, which enables faster correlation of events, and thus faster identification of possible security incidents. All incidents are based on event intent. In an example embodiment, a central database maintaining a set of taxonomy of cyber-threats detected by security devices is provided. In another embodiment, the cyber-threats are classified to one or more predefined set of categories. The classification is based on textual metadata associated with the detected threats and performed using natural language processing (NLP) techniques. The set of categories may be changed over time.

In an embodiment, a threat category may be represented by a security service. Such a service is a logical entity representing collections of logical security functions that are provided by a cyber-solution category. In an embodiment, discussed in more detail below, a security service can be executed or evaluated by one or more preconfigured security engines, which represents the threat category in more details and granularity (i.e., a narrower description of the threat's intent). The classification can be performed directly to one or more security engines.

FIG. 1 is an example diagram 100 utilized to describe the various embodiments for cyber-threat classification. The diagram 100 illustrates a cyber-security system 110, connected to a classification controller 120, which is connected to a threat database 130 and a classifier 140. The classification controller 120 also communicates with a plurality of external information resources, collectively labeled as 150.

The cyber-security system 110 is configured to provide a request to classify a threat detected by the system 110. Such a request can be triggered if, for example, there is no known classification of a threat to a category saved in the system 110. As noted above, a category may be a security service or engine, discussed in more detail below. In an embodiment, the cyber-threat (or simply the threat) may be a malware, an intrusion attempt (IDS signature), a URL with bad reputation score, and so on.

The classification controller 120 is configured to receive the request and determined if a matching classification is found in the threat database 130. The threat database maintained for each threat a textual description of its name, its hash value, a product detected such threat. Further, each threat is maintained in the database 130 with its respective category. If the threat database 130 includes information that can serve the request, such information is returned to the system 110. That is, at least the respective category associated with the threat designated in the request is received.

When no classification information is available in the database 130, a threat classification process is performed by the classifier 140. In an embodiment, the classifier 140 gathers textual (human written natural language) information and performs textual classification using NLP. The operation of the classifier 140 is discussed in detail below. Any threat classification determined by the classifier 140 is saved in the threat database 130 and may be returned to the cyber-security system 110.

In an embodiment, during the threat classification threat information from the external resources 150 is retrieved in order to gain threat description or enrich the threat description included in the received request. For example, the same threat (e.g., malware) may be recorded with difference aliases, such aliases are obtained from the resources 150. As another example, different textual information and description of the same threat can be found in the resources 150. The external resources may include databases, websites, blogs and the like of cyber research organizations (e.g., Virus Total, Trendmicro, Kaspersky Lab Threat, etc.), security vendors' portals and databases, and the like.

In some configurations, the classification controller 120 and classifier 140 are integrated in the same device. In yet another embodiment, the classification controller 120 and classifier 140 may be part of the cyber-security system. The threat database 130 may be deployed "on-premise" and/or in a cloud-computing platform. Such deployment would allow multiple-cyber security systems to access the threat database 130. Further, the classification controller 120 and classifier 140 may also be deployed in a cloud-computing platform to provide the cyber-threat classification as a service.

Figure 2:
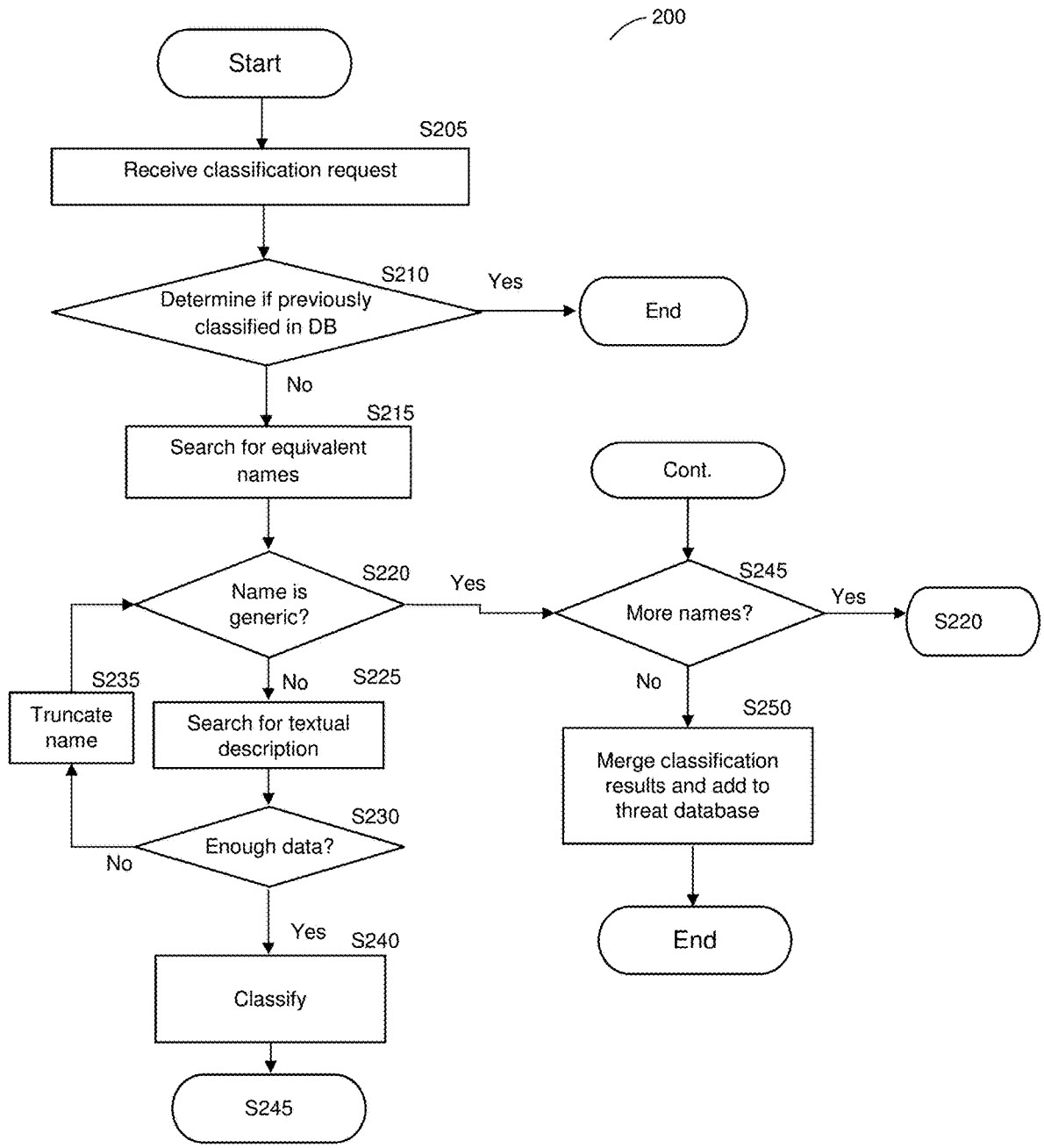
FIG. 2 is a flowchart illustrating a method for classifying cyber threats according to an embodiment.

FIG. 2 is an example flowchart 200 illustrating a cyber-threat classification method according to an embodiment.

At S205, a request for a threat classification is received. The request may be triggered by the detection of a threat by a cyber-security system requesting the classification. In an embodiment, the classification is of a threat (e.g., a malware)

to a security service, and engine within the service, implemented by the cyber-security system. The request may include initial information about the detected threat. Such information may include at least an identifier of the threat as recognized by the security system.

At S210, it is determined if the threat is known and falls into any predetermined threat categories. If so, the threat can be positively identified, and the process ends. Otherwise, the process continues with S215. This determination may include comparing the known features of the perceived threat, such as a file hash value, with a database (e.g., the threat database 130) containing classifications of known threats. That is, when the features of the threat are known (e.g., an attack name in the log, the hash value, etc.) and previously classified, a new classification process is not performed. In this case, the threat category is retrieved from the database and returned to the cyber-security system.

At S215, S220, S225, S230, and S235 an attempt is performed to enrich the threat information. At S215, a search is conducted using one or more external resources (such as resources 150) to determine if the same perceived threat is identified differently by other threat centers provided by security vendors, security intelligence services, and so on. In an embodiment, S215 includes mapping the threat identifier into a set of determined aliases (i.e., equivalent identifiers) used to describe similar threats by different vendors.

The mapping may improve the accuracy of the classification, as the assessment can be based on the analysis of a plurality of resources rather than relying on a single resource. The mapping further allows for dependency on multiple security vendors that use different names and identification paraments to classify a single threat. For example, a first vendor may be able to identify a perceived threat by a generic indicator, such as a generic name (e.g., Trojan), but may have no additional information about the threat. For example, a Trojan malware can be associated to different threat intents such as RAT, a keylogger, a memory scrapper, and the like. However, a second vendor may have already analyzed the same threat and determined additional information on the threat, using a different name. By matching equivalent identifiers, the second vendor may now relay the determined additional information for the analysis of the first vendor.

At S220, it is determined if the known features of the perceived threat, such as a file name or hash value is identified using a generic identifier. For example, if the file name of a perceived threat is "application.exe," it may be determined that such a file name demonstrates a generic identifier and fails to contain useful information, and as such, any further analysis may be deemed unlikely to provide useful classification direction. In that case, execution continues with S245. In an example embodiment, a list of predefined generic identifiers is utilized for the determination made in FIG. 2.

At S225, if the known features of the perceived threat are not deemed generic (including a generic identifier), a search for a textual description of the perceived threat is completed using external data resources, where the data resources describe the threat using natural language.

At S230, it is determined if the known features of the perceived threat are specific, such that they provide no useful information from a search inquiry. If that is the case, the known features of the perceived threat are truncated at S235 to obtain, for example, a generic identifier, and execution returns to S220. In an example embodiment, a list of predefined specific identifiers is utilized for the determination made in FIG. 2.

For example, the filename of a perceived threat may be shortened by a predetermined number of characters. If the resulting identifier outputs a name that is too generic and it is determined that no valuable information can be gathered, the specific external resource is then omitted, and the process continues at S245.

At S240, the perceived threat is classified using a classifier implementing, for example, natural language processing (NLP). The textual information of the perceived threat is classified into a vector of security logical functions (i.e., security engines with in a service) based of threat textual metadata and textual information gathered from one or more external third-party threat intelligence data sources. The operation of the classification steps is discussed in detail below with reference to FIGS. 3 and 4.

At S245, it is determined if there are more identifiers such as, names of the perceived threat, left to analyze. If so, the process returns to S220. Otherwise, at S250, a merging algorithm is executed, which may take into account among other things the quality of each resource and merge the classification results into a single vector of security services and engines that represent intents. The merged classification results may be added to a database (e.g., the threat database 130) for future reference.

Following, is a non-limiting example for the operation of the cyber-threat classification process. In this example, a request includes the following malware name of a threat detected by a first security product (e.g., Mcafee) "artemis!d7a9c1e6e93e". Such description does not suggest the intent of the malware, thus classification is required. In this example, a first external resource (e.g., Virus Total) is queried to find the name of the malware in other threat data centers of $3^{rd}$ party security intelligence services and security vendors. The query may return the following example aliases:

| Security Vendor | Malware Name |
| --- | --- |
| Kaspersky | not-a-virus:heur:adware.win32.generic |
| Microsoft | pua:win32/installcore |
| Trendmicro | adw_installcore |
| | pup_installcore |

Then, a data resource of each security vendor or service is searched using the respective aliases to retrieve the threat description. For example, querying Trendmicro we would return the malware adw_installcore is described as follow:

"Infection Channel: Dropped by other malware, Downloaded from the Internet This adware arrives on a system as a file dropped by other malware or as a file downloaded unknowingly by users when visiting malicious sites. It may be manually installed by a user. It connects to certain URLs. It may do this to remotely inform a malicious user of its installation. It may also do this to download possibly malicious files onto the computer, which puts the computer at a greater risk of infection by other threats."

The malware pup_installcore is described as follows:

"This Potentially Unwanted Application arrives on a system as a file dropped by other malware or as a file downloaded unknowingly by users when visiting malicious sites."

The NLP processing would conclude that the intent of the malware is: "generic adware" and "pup" respectively. Therefore, based on the threat's name classification (i.e. classification by the name of the malware) it is determined that the malware intent is "generic adware" or "pup" (i.e., a classification vector containing these two intents), and is associated with the relevant security service and engine accordingly.

Figure 3:
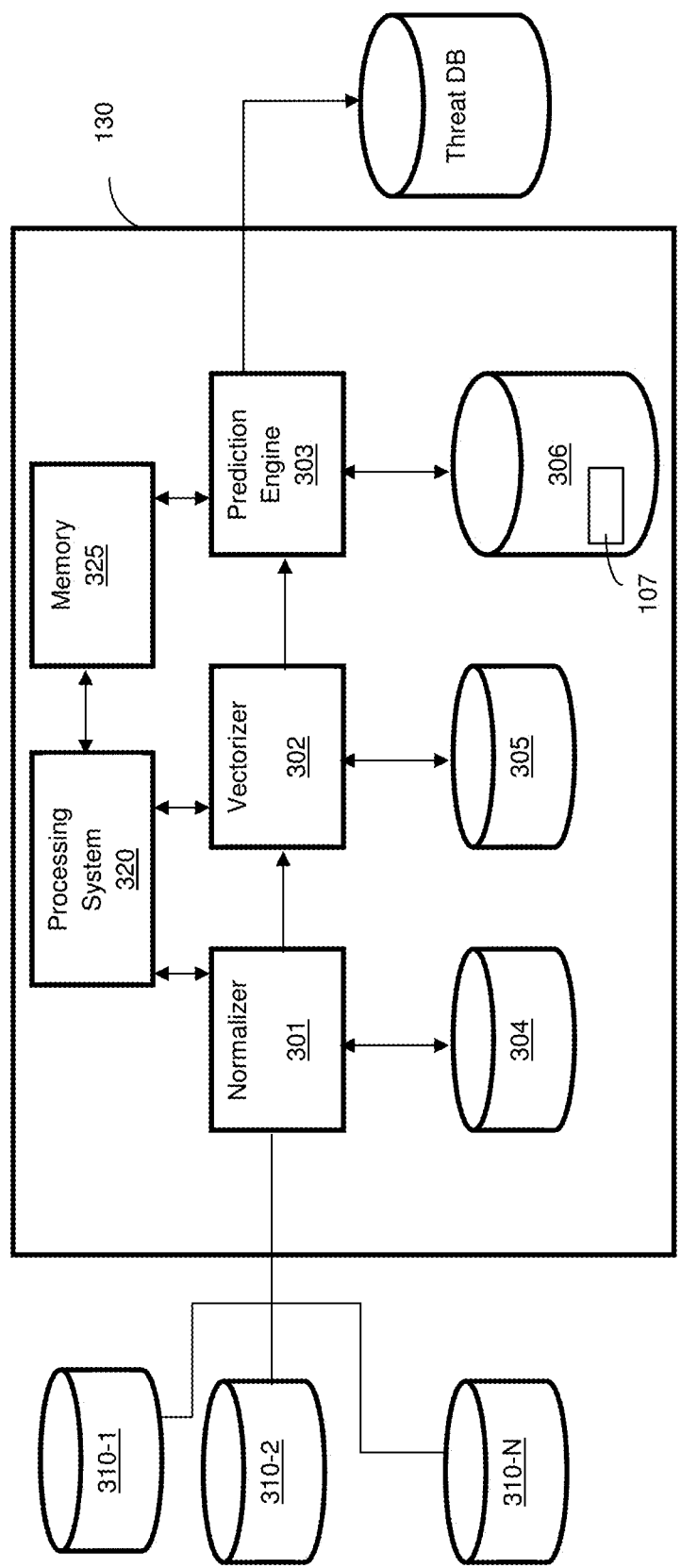
FIG. 3 is a block diagram of a classifier implemented according to an embodiment.

FIG. 3 shows an example block diagram of a classifier 130 configured to classify cyber-threat to security services according to an embodiment. The classification is based on the textual description of the threat. Such description includes the threat's name, hash value, and a security product detecting the threat.

In an embodiment, the classification of each cyber-threat is for a security service and an engine configured to handle a specific cyber-solution category. For example, a cyber-threat can be classified to an intrusion detection system (IDS) service and a "privilege escalation" security engine (within the service), reconfigured, e.g., to identify malware that aims to escalate privileges of an account in a malicious manner.

Other security services may include, but are not limited to, a network anomaly behavior security service with engines such as abnormal data transfer, intelligence gathering, brute force activity (that represent a narrower intent classification), a user entity anomaly behavior security service, an anti-malware security service with engines such as credit card memory scraper, SSN scrapers, droppers, RAT, and the like, a reputation security service, IDS security service with engines such as privileges escalation, an antivirus (AV) security service, and a Web application (WAF) security service with engine such as a SQL injection, XSS, and the like.

A plurality of threat information resources (TIR) (hereinafter referred to collectively as TIR 310) are connected to the classifier 130. Each such TIR e 310 includes textual description of threats as identified by different threat centers that are managed by security vendors, security expects, and/or security research organization.

Each threat in the TIR 320 can be associated with a security vendor and product detected or recorded the threat. For example, the security product may be an anti-virus system and the textual description may include the virus name and hash value computed over the virus file patterns generated by the anti-virus vendor and product. Different products, such as those provided by McAfee®, Symantec®, Blue Coat®, etc. may provide different textual description of the same threat.

It should be noted that the contents of the TIR 310 can be dynamically updated. Such an update typically occurs when new threats (e.g., new attack patterns) are identified or when rules stored in the TIR 310 are no longer relevant. It should be further noted that new TIRs can be added, and existing TIRs can be deleted.

In an example embodiment, the classifier 130 includes a normalizer 301, a vectorizer 302, and a prediction engine 303. The normalizer 101 is communicatively connected to a database 304 including metadata of identified threat information as obtained from the RIT 310. In an embodiment, the database 304 may also include weights defining the different values. The vectorizer 302 is communicatively connected to a database 305 that includes a vocabulary of indicative terms commonly used to describe one or more types of cyber threats, and a vector's index assigned to each indicative term. The indicative terms and their indexes are utilized during the classification process. The prediction engine 303 is communicatively connected to a database 306 containing at least a trained classification model for classifying cyber-threat to security engines of a security service. The database 106 may also include white and black lists of security rules for a security engine.

In an embodiment, the databases 304, 305, and 306 may be internal or external to the classifier 130. The databases 304, 305, and 306 may be realized using any storage or computer readable medium. Alternatively, some or all of the databases can be realized as a data structure (e.g., files) saved in common memory. In another embodiment, the contents of one, some, or all of the databases 304, 305, and 306 are provided as an input to the classifiers.

The normalizer 301 is configured to transform the threat information into a unified format. For example, the normalizer 301 may be configured to, for example, convert all letters in one security identification into a single representation (e.g., lowercase); remove stop-words which are not indicative of the security rule and/or threat (e.g., words such as "and," "it," "in," and "under" are considered stop words), stemming words having the same root (e.g., the words "programmer" and "programmable" have the same root "program"). The output of the normalizer 301 is a normalized string representing textual threat description of a cyber-threat.

The vectorizer 302 is configured to transform each normalized string into a quantitative vector of values. In an embodiment, prior to computing the values the unigrams, bigrams, and/or trigrams of the stemmed words are analyzed (or identified) by the vectorizer 302 and added to the vector of values. The unigrams, bigrams, and/or trigrams are added respective of the weight's assigned to the field.

In an embodiment, the value is computed based on the appearance of indicative terms in the normalized string. That is, the value is proportional to a level of appearance of the term in the textual threat description. The values in the vector can be either numeric or binary values. The numeric values can be computed, for example, by using a term-frequency (TF) method, a term-frequency inverse document frequency (TF-IDF) method, and the like. Such methods compute a numerical statistic intended to reflect how important a term is in a snippet of text. In order to provide an accurate classification, the frequency of only indicative terms in the normalized string is computed. The indicative terms, and their index in the vector, are designated in the threat vocabulary database 305.

The binary values in the normalized vectors are determined based on the existence of indicative terms in the normalized string. Each indicative term found in the normalized string is assigned with a value of binary value of '1' while other term with a binary value '0'. The output vector, in its binary representation, can also be normalized including a sequence of '0' values (if any) and '1' values (if any).

It should be noted that each vector output by the vectorizer 302 corresponds to a single threat. Thus, for 'm' (m is an integer greater than 1) processed threats, the output of the vectorizer 302 would be a matrix of 'm' columns, i.e., number of threats, and 'r' rows is the score of each indicative term.

The prediction engine 303 is configured to map each column (representing a threats vector) in the input matrix (from the vectorizer 302) to respective security engine of a security service. The mapping is performed using a classification model 307 stored in the database 306.

In another embodiment, the classification model 307 is a vector defined by a set of weights. In an example, the weights are either positive or negative values indicating the probability that a term will be mapped to a specific security engine of a service. Positive and negative weight values indicate high and low probabilities respectively.

In an embodiment, the prediction engine 303 is configured to apply the classification model 307 in the input matrix and to compute a classification score for each vector in the matrix (i.e., for each rule). The score indicates if a vector (a rule) can be classified into security engines of a service designated in the classification model 307. In an embodiment, the classification score of each vector can be computed using a machine learning metric. Examples for such metrics include root mean square error (RMSE), mean absolute error, F-score, and the like. Classification of each security rule having a classification score below a certain threshold is ignored.

In an embodiment, the association of vectors to security engines based on the computed score is further checked against the black and white lists of security rules. Both the white and black lists are created per security engine. The white list of security rules lists all known rules that at a high certainty can be associated with a specific security engine. The black list includes threats that cannot be associated with a security engine. In an optional embodiment, the check includes computing a percentage of "white list rules" that cannot be recognized using the classification model 307. If such percentage is higher than a predefined threshold (e.g., 5%) a message may be generated indicating that the result of the engine 303 is inaccurate. In an embodiment, the check includes computing the percentage of "black list rules" being recognized using the classification model 307 for particular security engine. If such percentage is higher than a predefined threshold (e.g., 5%) a message may be generated indicating the prediction process is inaccurate.

The accuracy in the results of the prediction engine 303 is based in part on the accuracy of the classification model 307. The classification model 307 is generated based on previous classification process(es) and/or prior knowledge input by a user. A detailed discussion for generating the classification model 307 is provided below.

The output of the classifier 130 is a list of cyber-threats associated with at least one security engine within each security service. In an example embodiment, the output is formatted as a two-dimensional matrix. Each row vector in the matrix includes scores per threat, that characterizes the level of association of the threat to a security engine (such that the number of rows represent the number of security engines and the number of columns is set according to the number of threats). In an embodiment, the classified security engine can be grouped as a security product profile. Such profiles can be utilized to determine the efficacy of each security product in detecting and/or investigating a threat associated with the security engine (e.g., network scan engine, malware propagation engine, brute force attacks engine etc.).

In an embodiment, the classifier 130 can be implemented in software, firmware, hardware or any combination thereof. When implemented in hardware or as combination hardware and software/firmware, the classifier 130 includes a processing system 320 coupled to a memory 325. The processing system 320 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The memory 325 may be any machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing system, cause the processing system to perform the various threats described herein for classifying security threats.

Furthermore, the normalizer 301, the vectorizer 302, and/or the prediction engine 303 may be realized as a processing system having the configuration discussed above. The databases 304, 305, and 306 can be realized as a storage device, such as a magnetic storage, optical storage, a Flash memory or other memory technology, or any other medium which can be used to store the desired information.

Figure 4:
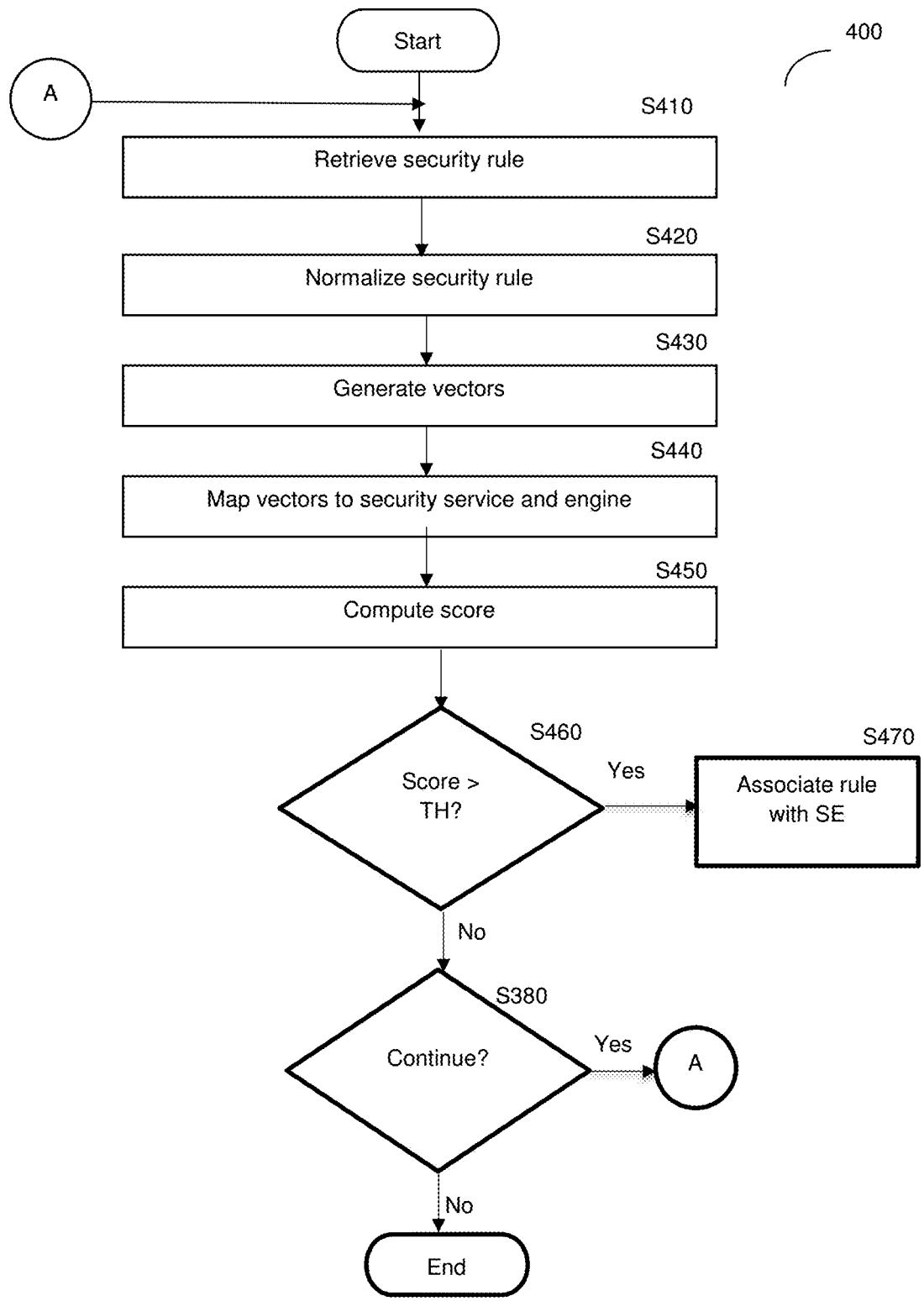
FIG. 4 is a flowchart illustrating a method of operation of the classifier for classifying cyber threats to security engine according to an embodiment.

FIG. 4 is an example flowchart 400 of a method for classifying security threats to security engine within a security service according to an embodiment. At S410, textual description of the cyber-threat is received.

At S420, the textual description of the cyber-threat is normalized to result in a normalized string representing the threat. Specifically, as discussed in detailed below, the normalization includes converting all letters in each retrieved field security rule into a single representation (e.g., lowercase); removing stop-words which are not indicative of the security rule and/or threat; and/or stemming words having the same root.

At S430, a vector representing the threat is generated based on the indicative terms found in the normalized string. The indicative terms are retrieved from a threat vocabulary database (e.g., database 305). As noted above, the vector can be computed as a set of binary or numeric values. In an embodiment, an NLP process can be utilized to perform S430.

At S440, a generated vector is mapped to a set of security engines (i.e., intents). The mapping is performed based on a classification model (e.g., model 307). Such mapping may be statistical, deterministic, or heuristics mapping. In an embodiment, the rules including one or more indicative terms in common will be mapped (or classified) to the same security engine of a service).

To demonstrate the operation of S440, the following threat will be mapped to "network scan" engine (i.e., network scan intent) within the IDS security service. It should be noted that rules demonstrated herein are not presented in their normalized and vectorized representations merely for simplicity purposes and without limitation on the disclosed embodiments.

At S450, a classification score is computed. As noted above, the classification score indicates the accuracy of the classification (e.g., the probability that the rule was correctly mapped to a security engine). In an optional embodiment, S450 may include computing a percentage of "white list rules" and/or "black list rules" in order to verify the classification results. The percentage of the "white list rules" and/or "black list rules" may be computed only when the number of classified rules is above a certain threshold.

At S460, it is checked if the classification score and/or one or both of the white list and black list percentages is equal to or greater than a respective predefined threshold (TH). If so, execution continues with S470; otherwise, execution continues with S480. At S470, the cyber-threat is associated with a security engine. Such association may be based in a database and/or provided to a security engine. Otherwise, the classification is ignored.

At S480, it is checked if there are additional security rules to classify. If so, execution continues with S410; otherwise, execution terminates.

The classifier 130 is configured to operate online or in real-time, i.e., continuously during the ongoing operation of the cyber security system. This allows for classification of new or modified cyber-threats. The classification model 307 is typically developed during an offline process and uploaded to the classifier 130 once ready. An example embodiment for generating a classification model is discussed in U.S. patent application Ser. No. 15/182,827, assigned to the common assignee and its hereby incorporated herein by reference.

Figure 5:
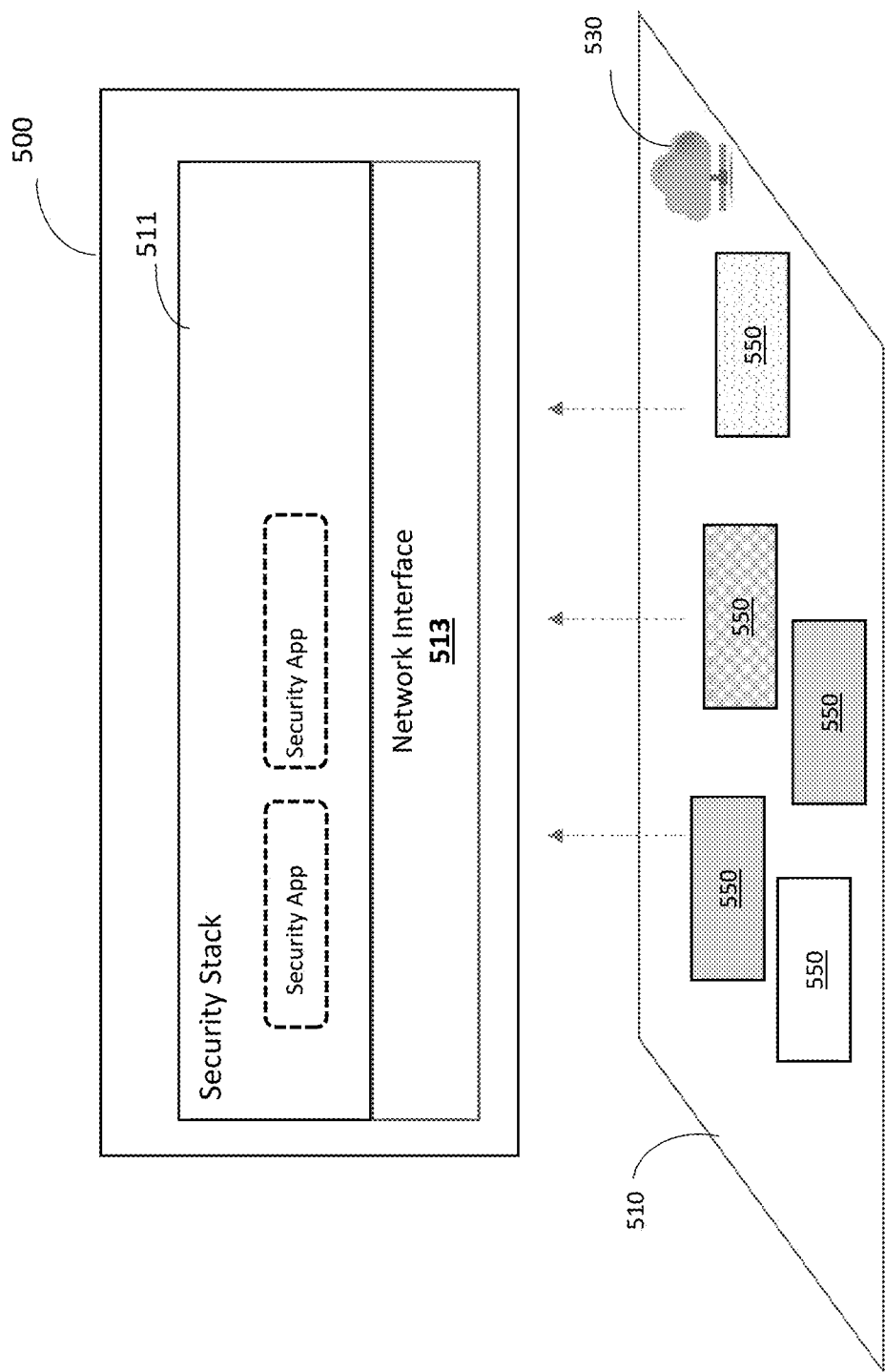
FIG. 5 is a diagram of a cyber-security system utilized to describe the various disclosed embodiments.

FIG. 5 is an example diagram of a cyber-security system 500 in which the classifier 130 can be operated according to one embodiment. The cyber-security system 500 is configured to protect an entity (hereinafter a "protected entity") 530 communicatively connected in a network 510. The cyber security system 500 is also connected to the network 510. The network 510 may be, but is not limited to, a virtualized network, a software defined network (SDN), a hybrid network, a cloud services network, or any combination thereof. In an embodiment, the cyber-security system 500 is configured to operate in detection, investigation, and mitigation phases.

In an example configuration, the cyber-security system 500 includes a security stack module 511 and a network interface 513. The security stack module 511 is configured to control and execute the various phases to protect the protected entity 530. Specifically, the security stack module 511 is configured to create, control, program, and execute a plurality of security applications or "apps." In an embodiment, the security stack module 511 includes the classifier 100 (not shown in FIG. 5) utilized to classify plurality of attack databases of the various security products to the security services realized through the module 511. The operation of the security stack module 511 is discussed in greater detail herein below with respect to FIG. 6.

The network interface 513 provides an interface layer of the cyber-security system 500. Such communication can be with SDN-based network elements or "legacy" network elements (not shown) in the network 510. The network interface 513 supports communication drivers to allow communication through elements, such as border gateway protocol (BGP) flow specifications, NetConf, command line interfaces (CLIs), NetFlow, middle-box devices drivers (e.g., L4-L7 drivers, DPI device drivers), end point device drivers (mobile, host-based security applications), server applications, and so on.

The network interface 513 also interfaces with a plurality of security products 550. Such security products 550 are designed to protect against different cyber threats. Examples for security products are provided below. In an embodiment, the system 500 is configured to orchestrate the operation of the various security products 550 through execution of the security applications. The execution of such application requires signals (or events) generated by the security engines. The security engines require that the various cyber-threat handled by the security products will be continuously classified correctly into them in real time or near real time, thus the classifier 130 provides in an important role when executing the security applications.

Figure 6:
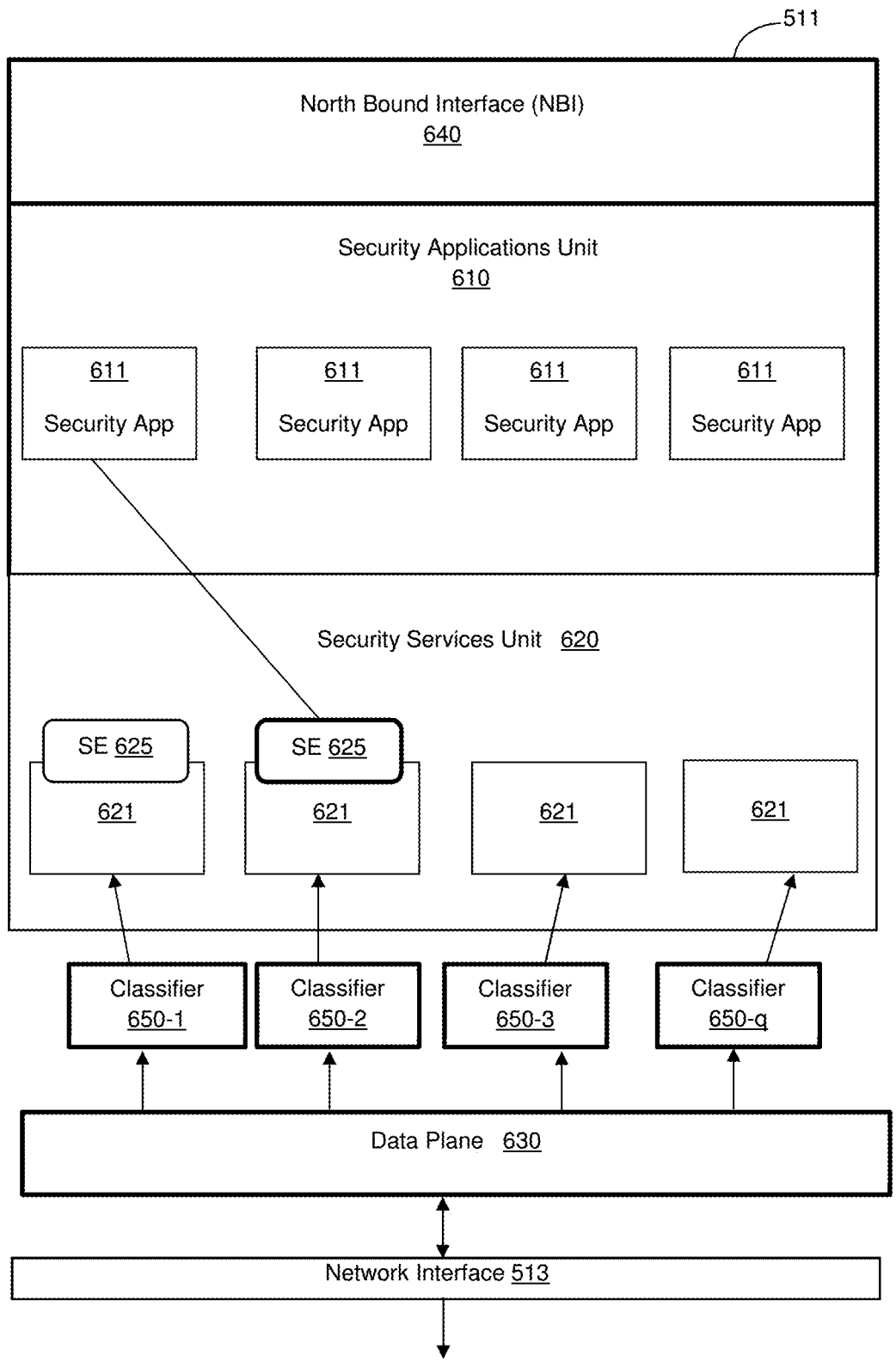
FIG. 6 is a block diagram of a security stack of the cyber-security system.

FIG. 6 shows an example block diagram of the security stack module 511 implemented according to an embodiment. In an example implementation, the security stack module 511 includes the following units: a security applications unit 610, a security services unit 620, a data-plane unit 630, and a northbound interface (NBI) 640. The security stack module 511 includes security services 621 that are reusable across different security applications ("app") 611. Thus, different security applications 611 (each one for a different purpose) can consume the same security services 621 for their own needs.

Specifically, the security applications unit 610 includes security applications 611. Each security application 611 represents a different type of security protection including, for example, ransomware attack campaign detection and mitigation, intelligence gathering detection and mitigation, insider threat detection and mitigation, data-leak, and so on. The modules interfacing with a security application provide the required services and security engines 625, thereby allowing the creation or otherwise updating of a security application according to evolving security needs.

In an embodiment, the security applications unit 610 is preconfigured with a set of security applications 611. Additional security applications 611 can be added and removed from the security applications unit 610 as needed. In an embodiment, all security applications 611 hosted in the security application unit 610 implement pre-defined APIs in order to efficiently communicate with the security services 621.

The security services unit 620 includes different types of security services 621. Each security service 621 is designed to serve one or more security applications 611. The security services 621 are also designed to provide efficient control and data collection over security rules provided by the security products 550. The classification of the security rules into the services 621 and one or more security engines (SEs) 625 of the services is performed by the classifier 100 as discussed in detail above. Each security service 621 may include one or more preconfigured security engines 625.

Following are example security services 621 that can be maintained and executed by the security services unit 620. A first type of security service provides programmable anomaly detection of network activities toward the network elements (e.g., toward routers, switches misuse of bandwidth resources, and so on).

Another type of security service 621 provides programmable anomaly detection of network activities toward the server applications (e.g., Web, mail, FTP, VoIP, on so on). Another type of security service provides programmable detection of users' anomalous activities.

Another type of security service 621 allows for managing and analyzing multiple types of security reputation sources (third party intelligence security sources). The reputation database maintains reputation information of network entities such as clients and services (sites). Such reputation information may be used to evaluate if these entities can possess a threat. A threat may be, for example, a source of SPAM activities, a command and control server, drop zone servers, websites that are known to be phishing sites, sites that include malware software, and the like.

Another type of security service 621 allows programing advanced challenge-response actions that validate the legitimacy of users' applications. Yet another type of security service 621 allows to collect and classify events from anti-malware sandbox products.

Yet another type of security service 621 allows for collecting and classifying event from anti-virus products.

Yet another type of security service 621 allows for collecting and classifying events from multiple IDS and IPS devices.

Yet another type of security service 621 generates attack risk-chain patterns. These attack risk-chain patterns represent sequences of attack stages within an advanced attack campaigns. These attack risk-chain patterns can be used for real-time mitigation of threats, as well as for forensic analysis.

Some or all of the services 621 may operate with a security engine 625. A security engine is configured with a set of engine rules, manually or automatically. In some cases, a user can modify and program new security engines 625 by defining a new set of engine rules. In an embodiment, a security engine with in a network/user traffic anomaly service, is programmed to continuously generate a score of anomaly (SoA) per user or per user group the security engine analyzes. Each generated SoA may include, but is not limited to, a value and metadata representing the characteristics of anomalous traffic flows such as, e.g., IP addresses, client name, service name, L4 protocol, L7 protocol, L4 port, and so on. High values of generated SoAs reflect unusual user application activity, such as communication with drop points (or drop zone), communication with command and control servers, malware propagation activities, application brute-force, application scans, user-misbehaving applications (e.g., fake applications), and so on. A drop point provides internal and external drop-points/zones that are used as part of advanced information stealth attack campaigns.

It should be noted that programmability of the security stack module 511, as enabled by the architecture of the system 500, allows a user to select different types of security services 621, thereby providing a mix and match capability. Specifically, this capability is achieved by the data plane unit 630 and a network interface module 513 which provides an abstraction layer for all underlining data-plane rules in the network (such as routers, switches, DPI devices, sandbox servers, and so on).

Information that is needed for operation of the security services 621 may be retrieved from the data-plane unit 630 and/or from the north bound interface 640. It should be noted that the security services 621 in the security services unit 620 also communicate and interface with the security applications unit 610 (the security applications unit 610 controls and manages the security services 621 in the security services unit 620).

It should be further noted that the security services 621 listed above are merely examples, and that other security services can be utilized in the cyber-security system 600 without departing from the scope of the embodiments disclosed herein. In various non-limiting embodiments, a programming language is provided in order to allow users to create and modify security applications and to create and modify the security engines included in each security service, as per business needs.

The data-plane unit 630 provides central management of the data-plane resources such as routers, switches, middle-box devices, and so on. In an embodiment, the data plane unit 630 allows the security services to retrieve and store the required network and application information from the data plane resources as well as to enforce security network control actions. Various functions provided by the data plane unit 630 include topology discovery, data collection, and traffic copy and redirection services which include traffic distribution (L2, L3 load balancing for scaling out network resources), traffic copying, and so on.

Topology discovery involves interacting with the data-plane network elements, SDN controllers, and orchestration systems in order to retrieve network topology information. This function is important for the topology awareness that is needed by other data-planes' functions as well as security services and applications.

The traffic copy and redirection services are designed to manage all network traffic redirection functions which include, but are not limited to, traffic redirection, smart traffic copying (copy based on L2-L4 traffic filter parameters), traffic distribution, and so on.

The data collection may involve collecting statistics data from probes deployed in the network and storing such statistics. The statistics collection may include, but are not limited to, network-based statistics from network elements; application-based network statistics from DPI resources (including middle-boxes and servers); and user-based statistics from network, DPI, middle boxes, and end-point resources. The collector services normalize the statistical information into a format that can be analyzed by the security services 621 in the security services unit 620.

Also included in the security stack module 511 are a plurality of classifiers 650-1 through 650-*q* connected to the security service unit 620. Each classifier 650 operates as the classifier 130 discussed in greater detail herein above. It should be noted that one cyber-threat can be classified to one or more security services 621 and engines 625, thus processed by one or more classifiers 650. The access to the security products (550, FIG. 5) is performed through the network interface 513 and the data plane unit 630. It should be further noted that each classifier 650 is configured to classify security rules of different products related to the same category of a cyber-solution to a respective security service 621 and its engines 625.

The data-plane unit 630 together with the security services 621 further provides the following functions: management of quality of service (QoS) actions in the network elements, and a set of mitigation functions. The mitigation functions include basic access control list (ACL) services, which are layer-2 to layer-4 access control list services that manage the distributed rules throughout the network elements. Software defined networks, as well as legacy network elements and hybrid networks, may be supported by this service.

Advanced ACL functions possess similar characteristics to basic ACL functions, but can define more granular access rules including application parameters (L7). Specifically, an ACL function can use the generated RT risk-chain pattern from a real-time risk-chain generation service (discussed above) as a blocking rule. It should be noted that risk chain patterns can be used by other services, such as investigation services (IDS/IPS, sandbox, and so on) to investigate specific flows and network entities that are included in the risk-chain pattern.

The ACL function typically operates with DPI network elements for enforcing the application level ACL rules. Service rate-limits manage the QoS rules in the data plane device. Black-hole route function provides an extension of the redirection data-plane services that manage redirection of users into a black-hole. Typically, black-holes are network locations where incoming or outgoing traffic is silently discarded (or "dropped") without informing the source that the data did not reach its intended recipient.

In an embodiment, the data-plane services allow both real-time detection and "near" real-time detection. Real-time detection of attacks is facilitated by feeding the statistics directly from the data-plane collectors, in real-time, to the security services unit 620 without storing the raw stats (i.e., storing only the result in the security services unit 620). In general, the data-plane unit 630 provides all raw information that is required by the security services 621 and controls the network via decisions made by the security services 621 and the security applications 611.

The north bound interface 640 interfaces between the security stack module 511 and one or more external systems (not shown). The external systems may include, for example, third party security analytics systems, security intelligence feeds, security portals, datacenter orchestration control systems, identity management systems, or any other system that can provide information to the security stack module 611. This enables wider context-based security decision making processes. In an embodiment, the interfaces 640 may include standard interfaces, such as CLI, REST APIs, Web user interfaces, as well as drivers that are already programmed for control, configuration and/or monitoring of specific third-party systems, and so on.

In an example embodiment, the security services 621 may include, but are not limited to, a network anomaly security service, a user application anomaly security service, an anti-malware security service, a reputation security service, IDS security service, a challenge-response security service, a risk-chain pattern generation security service, an anti-virus (AV) security service and a Web application (WAF) security service.

It should be noted that each of the security applications unit 610, the security services unit 620, the data plane 630, and the north bound interface 640, as well as the security stack module 511, are communicatively interconnected through a predefined set of interfaces and/or APIs. As a result, the cyber-security system 500 is fully programmable and configurable. The interfaces may be designed to be unidirectional, one-to-one bidirectional, or one-to-many bidirectional for flows of information between the various modules and units.

It should be further noted that modules in the cyber-security system 500, the security application unit 610, the security services unit 620, and the data plane 630 in the security stack module 611 are independent. Thus, any changes in one unit or module do not necessarily result in any changes to the other modules.

According to an embodiment, the cyber-security system 500 is designed to activate/deactivate and to correlate between security applications in unit 610 and security services and security engines in the unit 620 in order to define, create, or otherwise program a robust solution for detecting and mitigating attacks against the protected entity. The sequence for activating, deactivating, and correlating the various functions and modules of the cyber-security system 500, is based on one or more workflow rules. In an embodiment, the detection, investigation and/or mitigation functions are performed in the system 500 based on at least one workflow rule defined to handle a certain threat.

At a top level, the correlation model allows each security application to correlate feeds received from other security applications, thereby making the entire security decision-making process more holistic and context-based, i.e., correlating decision outputs from different security application types before making a final security decision.

To this end, each security application may communicate with other security applications and services and security engines by means of a controller (not show) managing the correlation of the different events.

At a lower level, the correlation of events occurs between multiple security services 620 based on signals generated by the respective engines 625. The events are generated in response to a security rule or rules processed by each engine. If the security rule is satisfied, then an event is output. For example, a network scan security decision engine attempts to match an attack signature defined in a security rule to network attributes. If a match is determined, then an event is generated and provided to a security application.

This allows a single security application to make decisions based on multiple services and security engines in order to increase the overall decision accuracy. Further, as each classifier 650 dynamically classifies the rules in the attack databases, it ensures that the security engines 625 operate on the most-updated rules. Therefore, the cyber-security system can adapt to new threats as they are identified.

According to one embodiment, the correlation of various feeds is performed by a set of workflow (or correlation) rules which are processed and applied by a controller of a security application. In an embodiment, the set of workflow rules is defined by the user. In another embodiment, the controller implements a learning mechanism to define or otherwise select a set of correlation rules to execute. The workflow rules are set respective of the attacks that the cyber-security system 500 can handle. That is, in an example implementation, a set of workflow rules is defined for each different type of threat.

Each, some, or all of the modules of the cyber-security system 500 and the various units of the security stack module 511 may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for classification of cyber-threats, comprising:
   receiving a request for classifying a cyber-threat detected by a cyber-security system, wherein the request includes initial information about the detected cyber-threat;
   querying a plurality of external resources to obtain textual information about at least one perceived threat related to the detected cyber-threat;
   enriching the initial information with the obtained textual information to form textual threat information;
   normalizing the textual threat information;
   vectorizing the normalized textual threat information into a vector; and
   classifying the at least one perceived threat by mapping the vector to at least one security engine.

2. The method of claim 1, wherein enriching the initial information further comprises:
   searching the external resources for cyber-threats similar to detected cyber-threat, wherein the search is performing using aliases matching a threat identifier of the detected cyber-threat; and
   retrieving from at least one of the plurality of external resources additional information related to the at least one perceived threat, wherein each perceived threat includes any one of: the detected cyber-threat and a cyber-threat similar to the detected cyber-threat.

3. The method of claim 1, wherein each external resource includes any information source maintained by any one of: cyber research organizations and cyber-security vendors.

4. The method of claim 1, wherein features of the at least one perceived threat include at least any of: a file name and a hash value of the least one the at least one perceived threat.

5. The method of claim 4, further comprising:
   classifying each of the at least one perceived threat using one or more artificial intelligence techniques.

6. The method of claim 1, wherein the security engine comprises at least one vector, each representing intent of the detected cyber-threat.

7. The method of claim 1, further comprising:
   determining an intent of each of the at least one perceived threat based on the classification.

8. A non-transitory computer readable medium having stored thereon instructions for causing a processing circuitry to execute a process for classification of cyber-threats, comprising:
   receiving a request for classifying a cyber-threat detected by a cyber-security system, wherein the request includes initial information about the detected cyber-threat;
   querying a plurality of external resources to obtain textual information about at least one perceived threat related to the detected cyber-threat;
   enriching the initial information with the obtained textual information to form textual threat information;
   normalizing the textual threat information;
   vectorizing the normalized textual threat information into a vector; and
   classifying the at least one perceived threat by mapping the vector to a security function of at least one security engine or service.

9. A cyber-security system for classifying security rules of a plurality of different security products into a security decision engine in a service, comprising: a processing circuitry;
 a memory connected to the processing circuitry, wherein the memory contains instructions that, when executed by the processing circuitry, configure the cyber-security system to:
 receive a request for classifying a cyber-threat detected by a cyber-security system, wherein the request includes initial information about the detected cyber-threat;
 query a plurality of external resources to obtain textual information about at least one perceived threat related to the detected cyber-threat;
 enrich the initial information with the obtained textual information to form textual threat information;
 normalize the textual threat information;
 vectorize the normalized textual threat information into a vector; and
 classify the at least one perceived threat by mapping the vector to at least one security engine.

10. The cyber-security system of claim 9, wherein the system is further configured to:
 search the plurality of external resources for cyber-threats similar to detected cyber-threat, wherein the search is performing using aliases matching a threat identifier of the detected cyber-threat; and
 retrieve from at least one of the plurality of external resources additional information related to the at least one perceived threat, wherein each perceived threat includes any one of: the detected cyber-threat and a cyber-threat similar to the detected cyber-threat.

11. The cyber-security system of claim 9, wherein each external resource includes include any information source maintained by any one of: cyber research organizations and cyber-security vendors.

12. The cyber-security system of claim 9, wherein features of the at least one perceived threat include at least any of: a file name and a hash value of the least one perceived threat.

13. The cyber-security system of claim 12, wherein the system is further configured to:
 classify each of the at least one perceived threat using natural language processing.

14. The cyber-security system of claim 9, wherein the security service includes one vector of a security engine, each representing intent of the detected cyber-threat.

15. The cyber-security system of claim 9, wherein the system is further configured to:
 determine an intent of each of the at least one perceived threat based on the classification.

* * * * *